3,311,571
INFUSIBLE SILAZANE POLYMER AND PROCESS
FOR PRODUCING SAME
Robert E. Burks, Jr., Robert E. Lacey, and Charles L. Christy, Jr., all of Birmingham, Ala., assignors to Southern Research Institute, Birmingham, Ala., a corporation of Alabama
No Drawing. Filed Aug. 30, 1965, Ser. No. 483,817
8 Claims. (Cl. 260—2)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to an infusible silazane polymer and process for producing the same and more particularly to a silazane polymer resulting from heating the non-crystalline, linear, low molecular weight, reaction product of diphenyldichlorosilane with a nitrogen-containing base in a reaction zone open to the atmosphere.

An object of our invention is to provide an infusible silazane polymer which shall have high thermal and chemical stability and be particularly adapted for use as a coating agent for various type materials, such as metals, glass and the like.

A more specific object of our invention is to provide an infusible silazane polymer of the character designated which may be in the form of a thick protective coating that does not crack on cooling.

A further object of our invention is to provide an infusible protective coating of the character designated which is less brittle and one which may be applied with a minimum of effort.

A still further object of our invention is to provide an infusible silazane polymer of the character designated which shall have extremely high thermal endurance after being cured at relatively low temperatures.

Heretofore in the art to which our invention relates, silylamine polymers have been produced in the form of thermoplastic materials which are viscous liquids or solids that are fusible, moisture-sensitive and soluble in organic solvents. Such a thermoplastic polymer is disclosed in the Groszos and Hall patent No. 2,885,370, wherein hexaphenylcyclotrisilazane is converted into plastic materials by heating at elevated temperatures in sealed tubes.

Briefly, our improved polymer is produced by reacting diphenyldichlorosilane with a nitrogen containing base to form a non-crystalline residue. The non-crystalline residue is then heated in a reaction zone open to the atmosphere at a temperature ranging from approximately 250° C. to 450° C. until the infusible polymer is formed. We thus produce an infusible polymer which is extremely stable to heat, acids, alkali and organic solvents.

In the art to which our invention relates, it is well known that hexaphenylcyclotrisilazane, a solid melting at approximately 215° C., may be prepared by the reaction of diphenyldichlorosilane with ammonia. A non-crystalline residue is obtained by evaporating the mother liquors after the crystalline hexaphenylcyclotrisilazane has been separated. In actual practice, we have prepared our improved composition by the following method:

*Example I*

Approximately 3 liters of benzene and 308 ml. (376 g., of 1.485 moles) of diphenyldichlorosilane were placed in a 5-liter, 3-neck flask fitted with a stirrer, reflux condenser and a gas inlet tube. Dry gaseous ammonia was provided for the reaction by allowing it to boil from a flask of liquid ammonia that contained sufficient sodium to produce a blue color. The chlorosilane solution in benzene was stirred under an atmosphere of ammonia for 4 hours. The mixture was refluxed for 4 hours and then allowed to cool. The Beilstein Test showed that chloride was absent from the supernatant solution. Ammonium chloride was then filtered off and the occuluded silazanes were extracted from it by stirring and filtering several times with 200 ml. portions of hot benzene. The benzene solutions were distilled until the pot temperature reached 95° C. The undistilled liquid was repeatedly cooled and filtered to obtain crystalline hexaphenylcyclotrisilazane, which amounted to 165.6 g. (0.28 mole, 56.5% of theory). The mother liquor was set aside for a week, and an additional quantity of hexaphenylcyclotrisilazane crystals were formed in that period of time. These crystals were separated by filtration and amounted to 49.9 g. (0.084 mole, 17.0% of theory). The non-crystalline, or resin content of the mother liquor was determined by evaporating an aliquot of it at 0.05 mm. pressure. The yield of the non-crystalline resin was 55.2 g. (0.28 mole), which was 18.8% of theory, if the amino end groups are disregarded, and the formula is assumed to be $(C_6H_5)_2$SiNH. Accordingly, the yield of the combined products was 92.3%. The non-crystalline resin produced was a pale-yellow sticky gum. Upon heating the non-crystalline resin in a reaction zone open to the atmosphere at a temperature ranging from 250° C. to 450° C. the infusible polymer is formed.

The resinous, non-crystaline product produced in accordance with Example I was freed of solvent and analyzed with the following results:

ANALYSIS OF RESINOUS NON-CRYSTALLINE PRODUCT PRODUCED IN EXAMPLE I

|  | Found percent | Theoretical $(C_6H_5)_2$SiNH, percent |
|---|---|---|
| Carbon | 72.74 | 73.02 |
| Hydrogen | 5.60 | 5.63 |
| Nitrogen | 5.64 | 7.11 |
| Silicon | 12.80 | 14.24 |
| Oxygen | 2.64 | 0 |
| Total | 99.42 | 100.00 |
| Molecular weight | 980 | 592 |

*Example II*

To form coatings, the non-crystalline reaction product produced in Example I was applied to aluminum panels from a 10% solution in benzene. An application of 0.2 ml. of the 10% solution over an area of 15 square centimeters followed by heating in air at 250–450° C. produced an infusible coating that was approximately 0.25 ml. thick.

Coatings of the non-crystalline reaction product of diphenyldichlorosilane with ammonia were also applied to aluminum panels to produce coatings of 0.75, and 1.25 mils in thickness. Little or no difficulty was encountered with cracking of the coatings during exposures to heat except at 500° C. and above. Even after an hour at 500° C., none of the coatings cracked when cooled.

The integrity of the coatings was evaluated by placing the panels in boiling water for an hour and then in 19% hydrochloric acid until the uncoated part of the panel become black. Coatings that were not cured did not withstand the boiling water and acid treatment. For example, coatings cured for one hour at 110° C. became slightly cloudy when immersed in boiling water for one hour, but they still afforded some protection from the acid. On the other hand, coatings of the non-crystalline product cured for one hour at 300° C. were visibly unaffected by the boiling water and they protected the aluminum from the acid until the uncoated areas were black and deeply etched. In actual practice, we have found that the non-crystalline reaction product of diphenyldichlorosilane with ammonia should be cured in a reaction zone open to the atmosphere at a temperature ranging from approximately 250° C. to 450° C. Preferably, the non-crystalline reaction product is cured in a reaction zone open to the atmosphere at a temperature of approximately 350° C.

When partly coated aluminum panels were heated at 550° C. the aluminum became discolored except under the coating. Coatings were also applied to stainless steel panels with essentially the same results as those obtained with aluminum.

To provide a coating which is more flexible, we add ethylenediamine silazane (which may be prepared by the reaction of ethylenediamine with dimethyldichlorosilane) to the non-crystalline reaction product of diphenyldichlorosilane with ammonia. Preferably, approximately 10% by weight of ethylenediamine silazane is added to the non-crystalline reaction product; however, we have found that the amount of ethylenediamine silazane can vary from approximately 5% to 25% by weight. The following example illustrates the manner in which the coating is prepared and the properties of the coating thus produced.

Example III

Ten percent solutions of the non-crystalline reaction product of diphenyldichlorosilane with ammonia and ethylenediamine silazane were prepared in benzene. The ethylenediamine silazane comprised approximately 10% by weight of the mixture of the non-crystalline reaction product and ethylenediamine silazane. An area of 15 square centimeters was marked on each of two 0.033-inch aluminum panels, and 0.4 and 0.6 ml. portions of the mixture were applied to the marked areas of the panels. The solvent was allowed to evaporate for 3 to 4 minutes, and the panels were placed in an oven at 135° C. for 30 minutes. The applied film weighed 0.0341 and 0.0544 g. While the films were smooth, shiny, colorless, transparent and flexible, they were relatively soft in that they could be scratched with a fingernail. The panels were then heated in air at approximately 370° C. for 18 hours. There was no visible change in the coating, but the coating could no longer be scratched with a fingernail. The final film weights were 0.0132 and 0.0201 g. The panels were bent repeatedly, and no signs of crazing were observed at the point of greatest curvature which had a radius of approximately 3 mm. The bent panel with the thinner coating was placed in 19% hydrochloric acid for about 5 minutes where deep etching occurred in all uncoated areas, while the coated areas remained bright and shiny.

The coating set forth in Example III was also applied to mild steel and cured to produce products which are satisfactory in every respect.

Coatings with excellent thermal and chemical stability can also be made from bis(methylamino)diphenylsilane by boiling it until it undergoes some polymerization by end group condensation to increase its boiling point. The material with reduced volatility is then applied as a coating and cured in a reaction zone open to the atmosphere at a temperature ranging from approximately 250° C. to 450° C. until an infusible polymer is formed.

Example IV

Bis(methylamino) diphenylsilane was prepared by a conventional method wherein diphenyldichlorosilane is reacted with methylamine (E. Larsson and L. Bjellerup, J. Am. Chem. Soc. 75 995–997 (1953). The bis(methylamino) diphenylsilane thus prepared was refluxed at 315–320° C. for two hours. On cooling, crystals formed and were removed by centrifugation. The residual non-crystalline residue was employed to make coatings on aluminum and stainless steel. A small amount of the coating material thus prepared was placed on a stainless steel spatula and heated slowly to red heat over a gas flame. At first the film smoked, and then it became solid. Red heat for about a minute did not destroy it and the film remained intact. A similar film was applied to an aluminum panel and was heated to approximately 600° C. whereupon the aluminum began to soften. After being cooled in a stream of water, the aluminum panel was badly warped, and it had a few cracks. However, the presence and continuity of the invisible coating was confirmed by placing the panel in 19° hydrochloric acid for 10 minutes. The uncoated areas were deeply etched, but the coated areas remained shiny except where the metal had cracked during heating. A similar coating was applied to an aluminum panel and after being heated in a furnace at 500° C for 45 minutes, the aluminum appeared to be unchanged. Also, a similar coating was applied to a stainless steel panel. The coating did not crack when the panel was bent repeatedly after being held at 500° C. for an hour.

The reaction of diphenyldichlorosilane with ammonia in benzene normally produces approximately 75% yield of hexaphenylcyclotrisilazane and a 17% yield of the non-crystalline residue. We have found that by including triethylamine in the reaction mixture, the yield of non-crystalline residue is increased to 90% and above. Accordingly, where a coating agent is desired, it is more economical to use triethylamine. By carrying out the reaction between diphenyldichlorosilane with ammonia in the presence of triethylamine, we not only increase the yield of the non-crystalline residue, but it is not necessary to remove any hexaphenylcyclotrisilazane that may be present.

We have also found that similar results are obtained by carrying out the reaction of diphenyldichlorosilane with methylamine in the presence of triethylamine, which produces an increased yield of the linear, polymeric, non-crystalline residue.

To form more flexible coatings, the non-crystalline residue formed in the presence of triethylamine is also heated with approximately 5% to 25% by weight of ethylenediamine silazane. Such coatings also require curing in a reaction zone open to the atmosphere at a temperature ranging from approximately 250° C. to 450° C.

The number of moles of triethylamine employed to facilitate formation of the coating agent is at least equal to the number of moles of diphenyldichlorosilane employed to react with the ammonia or methylamine.

The following is an example of the reaction between diphenyldichlorosilane with ammonia in the presence of triethylamine.

Example V

In a 500 ml. 3-neck round-bottom flask fitted with a stirrer, dropping funnel, a reflux condenser, and gas inlet tube were placed 300 ml. of benzene and 39.05 ml. (28.23 g., 0.279 mole) of triethylamine that had been purified by distillation from phthalic anhydride and then from potassium hydroxide. Then 28.90 ml. (35.32 g., 0.139 mole) of diphenyldichlorosilane was added dropwise with stirring. Ammonia was passed over the surface of the mixture thus formed for 2.5 hours as the mixture was stirred. The temperature rose to 40° C. and then returned to room temperature. After the mixture had stood overnight, a test for halogens was positive. Accordingly, ammonia was introduced for an additional two hours. The mixture was next heated while stirring to 80° C. and then allowed to cool. The salts were removed by centrifugation, and the solid was washed with benzene. The solvent was removed by distillation at reduced pressure. The final pot temperature was 87° C. The cloudy, tan viscous liquid product weighed 25.9 g., which was 94.1% of the theoretical yield when $$-Si(PH)_2NH-$$

was assumed as the formula of the product.

In the following example triethylamine was employed as the solvent.

*Example VI*

Diphenyldichlorosilane, 35.32 g.(0.140 mole) was added to 300 ml.(216. 9 g., 2.14 moles) of triethylamine, and the nammonia was introduced as set forth in Example V. The yield was 25.8 g., 93.7% of the theoretical when —Si(Ph)$_2$NH— was assumed as the formula of the product.

In the following example the molar ratios of triethylamine and diphenyldichlorosilane were 1:1.

*Example VII*

Diphenyldichlorosilane, 35.32 g.(0.140 mole) was added to 19.52 ml. (14.11 g., 0.140 mole) of triethylamine in 300 ml. of benzene, and then ammonia was introduced as set forth in Example V. The yield was 27.1 g., 98.4% of theoretical when —Si(PH)$_2$NH— was assumed as the formula of the product.

From the foregoing, it will be seen that we have produced improved, infusible silazane polymers which can be used as coatings of high thermal and chemical stability on metals, ceramics, glasses and the like. In actual practice, we find that coatings embodying our improved compositions are superior to the partially polymerized hexaphenylcyclotrisilazane products disclosed in copending patent application, Ser. No. 280,609, filed May 15, 1965, now U.S. Patent 3,228,895 and entitled Infusible Silylamine Polymer and Process for Producing Same, in that our improved coatings can be formed in thicker layers and they are less brittle. Also, our improved coating has equal or greater thermal endurance after being cured at lower temperatures.

We wish it to be understood that we do not desire to be limited to the precise examples, proportions or embodiments herein disclosed for obvious modifications will occur to a person skilled in the art.

What we claim is:

1. The process of producing an infusible silazane polymer having improved thermal and chemical stability from diphenyldichlorosilane which comprises:
   (a) reacting diphenyldichlorosilane in the presence of triethylamine with a nitrogen containing base selected from the group consisting of ammonia and methylamine to form a polymeric, non-crystalline reaction product, and
   (b) heating said non-crystalline reaction product in a reaction zone open to the atmosphere at a temperature ranging from approximately 250° C. to 450° C. until the infusible polymer is formed.

2. A process of producing a polymer as defined in claim 1 in which at least one mole of triethylamine is used for each mole of diphenyldichlorosilane used.

3. The process of producing a polymer as defined in claim 1 which includes the step of mixing ethylenediamine silazane with said non-crystalline reaction product prior to heating.

4. The process of producing a polymer as defined in claim 1 which includes, prior to heating at 250° C. to 450° C., the step of mixing ethylenediamine silazane produced by the reaction of ethylenediamine with dimethyldichlorosilane with said polymeric, non-crystalline reaction product.

5. The process of producing a polymer as defined in claim 4 in which ethylenediamine silazane comprises from 5% to 25% by weight of the mixture of ethylenediamine silazane and said reaction product.

6. A composition comprising an infusible silazane polymer resulting from heating in a reaction zone open to the atmosphere at a temperature ranging from approximately 250° C. to 450° C. until the infusible polymer is formed the polymeric, non-crystalline, low molecular weight, reaction product of diphenyldichlorosilane with a nitrogen containing base selected from the group consisting of ammonia and methylamine in the presence of triethylamine.

7. A composition as defined in claim 6 made from a mixture of said polymeric, non-crystalline reaction product with the ethylenediamine silazane produced by the reaction of ethlyenediamine with dimethyldichlorosilane.

8. A composition as defined in claim 7 in which the ethylenediamine silazane comprises from 5% to 25% by weight of the mixture of ethylenediamine silazane and said reaction product.

References Cited by the Examiner

UNITED STATES PATENTS

| | | | |
|---|---|---|---|
| 2,579,418 | 12/1951 | Cheronis | 260—448.2 |
| 2,885,370 | 5/1959 | Groszos et al. | 260—448.2 |
| 3,143,514 | 8/1964 | Boyer | 260—2 |
| 3,159,669 | 12/1964 | Rochow | 260—2 |
| 3,187,030 | 6/1965 | Boyer et al. | 260—2 |
| 3,228,895 | 1/1966 | Burks et al. | 260—448.2 |

LEON J. BERCOVITZ, *Primary Examiner.*

M. I. MARQUIS, *Assistant Examiner.*